(12) United States Patent
Itou et al.

(10) Patent No.: US 11,397,342 B2
(45) Date of Patent: Jul. 26, 2022

(54) OPTICAL MODULATOR

(71) Applicant: SUMITOMO OSAKA CEMENT CO., LTD., Tokyo (JP)

(72) Inventors: Takatomo Itou, Tokyo (JP); Yoshizumi Ishikawa, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/042,732

(22) PCT Filed: Feb. 26, 2019

(86) PCT No.: PCT/JP2019/007283
§ 371 (c)(1),
(2) Date: Sep. 28, 2020

(87) PCT Pub. No.: WO2019/187899
PCT Pub. Date: Oct. 3, 2019

(65) Prior Publication Data
US 2021/0018771 A1      Jan. 21, 2021

(30) Foreign Application Priority Data
Mar. 30, 2018  (JP) .............................. JP2018-069370

(51) Int. Cl.
*G02F 1/035*       (2006.01)
(52) U.S. Cl.
CPC .................................... *G02F 1/035* (2013.01)
(58) Field of Classification Search
CPC ....................................................... G02F 1/035
See application file for complete search history.

(56) References Cited

U.S. PATENT DOCUMENTS

| | | | |
|---|---|---|---|
| 6,480,633 B1* | 11/2002 | Fleming | ................. G02F 1/035 385/2 |
| 2004/0028334 A1* | 2/2004 | Marazzi | ................. G02B 6/327 385/49 |

(Continued)

FOREIGN PATENT DOCUMENTS

| JP | 07-019711 U | 4/1995 |
|---|---|---|
| JP | 08-146242 A | 6/1996 |

(Continued)

OTHER PUBLICATIONS

International Search Report for PCT/JP2019/007283 (dated May 21, 2019).

*Primary Examiner* — Tina M Wong
(74) *Attorney, Agent, or Firm* — Merchant & Gould P.C.

(57) ABSTRACT

An optical modulator according to the present invention comprises: a substrate which has electro-optic effects; an optical waveguide which is provided in the substrate; an optical fiber which is bonded to an end of the optical waveguide; a fixation member which is provided on an end part of the optical fiber; and an optical adhesive layer which bonds the optical fiber and the substrate to each other. The end of the optical waveguide is arranged in an end face of the substrate; the optical adhesive layer optically couples an end face of the optical fiber and an end of the optical waveguide with each other, while bonding the optical fiber, the fixation member and the substrate with each other; and the surface roughness of a surface of the fixation member, wherein the surface faces the end face of the substrate, is different from the surface roughness of an end face of the substrate, wherein the end face faces the surface of the fixation member.

13 Claims, 3 Drawing Sheets

(56) References Cited

U.S. PATENT DOCUMENTS

| | | | | |
|---|---|---|---|---|
| 2005/0105848 A1* | 5/2005 | Yamada | ............... | G02B 6/4214 385/31 |
| 2007/0122072 A1* | 5/2007 | Kondou | ................. | G02F 1/035 385/2 |
| 2021/0018771 A1* | 1/2021 | Itou | ....................... | G02F 1/0305 |

FOREIGN PATENT DOCUMENTS

| JP | 10-020146 A | 1/1998 |
|---|---|---|
| JP | 2006-178388 A | 7/2006 |
| JP | 2012-047865 A | 3/2012 |

* cited by examiner

OPTICAL MODULATOR

TECHNICAL FIELD

The present invention relates to an optical modulator. This application is a U.S. National Stage Application under 35 U.S.C. § 371 of International Patent Application No. PCT/JP2019/007283, filed on Feb. 26, 2019, which claims priority based on Japanese Patent Application No. 2018-069370 filed in Japan on Mar. 30, 2018, the disclosures of all of which are hereby incorporated by reference in their entireties.

BACKGROUND

In the related art, an optical modulation element having an optical waveguide formed on a substrate has been proposed. The light input/output of the optical modulation element may be performed by bonding and fixing an optical fiber to the input/output end of the optical modulation element by using an optical adhesive.

Hereinafter, in the present specification, a configuration in which an optical fiber is fixed to the input/output end of an optical modulation element is referred to as an "optical modulator".

A configuration is known in which an optical fiber has a core portion that propagates light and a clad portion that is concentrically formed around the core portion.

With respect to the optical fiber, a configuration is known in which the diameter of the core portion is about 10 μm, and the diameter of the entire optical fiber including the clad portion is about 125 μm. The area of the end part of such an optical fiber is smaller than the area of the end face of the optical modulation element.

Therefore, in the optical modulator in the related art, when the end part of the optical fiber is adhesively fixed to the end face of the optical modulation element, the adhesive strength of the adhesively fixed portion (adhesively fixed portion) cannot be sufficiently secured, so that problems are likely to occur in that the optical fiber is disconnected when a load is applied to the adhesively fixed portion.

To solve this problem, an optical modulator has been known in which a jig to be attached to the end part of the optical fiber is used, and the optical fiber and the jig are integrated to increase the adhesion area with respect to the optical modulation element and are bonded to the end part of the optical modulation element (for example, refer to Patent Literature No. 1). In such an optical modulator, it is possible to increase the adhesive strength of the optical fiber and reduce the load applied to the optical fiber of the adhesively fixed portion. In the present specification, such a jig is referred to as a "fixation member".

CITATION LIST

Patent Literature

Patent Literature No. 1: Japanese Laid-open Patent Publication No. 2012-047865

SUMMARY OF INVENTION

Technical Problem

When fixing the optical fiber to the end part of the optical modulation element, it is required to accurately align the end face of the optical fiber and the end face of the optical waveguide with precision of submicron or lower and the optical fiber and suppress optical loss at the connection position in which the optical fiber and the optical waveguide are connected. Therefore, normally, after the end face of the optical modulation element and the end face of the fixation member into which the optical fiber is inserted are butted against each other via an optical adhesive, alignment between the end face of the optical fiber and the end face of the optical waveguide is performed (optical coupling adjustment) while the end face of the fixation member in which the optical fiber is inserted is moved in the in-plane direction of the end face of the optical modulation element. Thereby, the optical fiber and the optical modulation element can be connected while suppressing the optical loss.

On the other hand, the end face of the optical fiber and the end face of the optical modulation element are usually mirror-finished in order to suppress loss due to irregular reflection of an optical signal. Therefore, when the end face of the optical fiber and the end face of the optical modulation element are butted against each other via the optical adhesive, the end faces are adsorbed to each other by the ambient atmospheric pressure and are easily fixed. When such adsorption occurs, it is difficult to move the end face of the optical fiber in the in-plane direction of the end face of the optical modulation element, and it is difficult to adjust the optical coupling between the optical fiber and the optical waveguide.

The present invention has been made in view of such circumstances, and the purpose is to provide an optical modulator which is capable of easily performing the optical coupling adjustment between an optical fiber and an optical waveguide, and which is suppressed in the optical loss.

Solution to Problem

In order to solve the above problems, a first aspect of the present invention is to provide an optical modulator including: a substrate which has electro-optic effects; an optical waveguide which is provided in the substrate; an optical fiber which is bonded to an end of the optical waveguide; a fixation member which is provided on an end part of the optical fiber; and an optical adhesive layer which bonds the optical fiber and the substrate to each other. The end of the optical waveguide is arranged in an end face of the substrate; the optical adhesive layer optically couples an end face of the optical fiber and an end of the optical waveguide with each other, while the optical adhesive layer bonds the optical fiber, the fixation member and the substrate with each other; and the surface roughness of a surface of the fixation member, wherein the surface of the fixation member faces the end face of the substrate, is different from the surface roughness of an end face of the substrate, wherein the end face of the substrate faces the surface of the fixation member.

The first aspect of the present invention preferably includes the following features. Two or higher of the following features may be combined with each other as long as there is no problem.

In the above aspect of the present invention, the surface roughness of the surface of the fixation member may be larger than the surface roughness of the end face of the substrate, which faces the surface of the fixation member.

In the above aspect of the present invention, a difference between the surface roughness $Ra_1$ of the end face of the substrate, which faces the surface of the fixation member, and the surface roughness $Ra_2$ of the surface of the fixation member is 0.2 μm or higher.

In the above aspect of the present invention, the surface roughness $Ra_1$ may be 0.2 μm or lower, and the surface roughness $Ra_2$ may be 0.4 μm or higher and 3 μm or lower.

In the above aspect of the present invention, wherein a distance between the end face of the optical fiber and the end face of the substrate may be larger than a distance between the surface of the fixation member and the end face of the substrate.

In the above aspect of the present invention, the fixation member may be a tubular member having a through-hole through which the optical fiber can be inserted.

Advantageous Effects of Invention

According to the present invention, it is possible to provide an optical modulator which is capable of easily performing the optical coupling adjustment between an optical fiber and an optical waveguide, and which is suppressed in the optical loss.

DESCRIPTION OF EMBODIMENTS

The optical modulator according to the present embodiment will be described below with reference to FIGS. 1 to 5.

In addition, in all the following drawings, in order to make the drawings easy to see, all or some of the dimensions, ratios, and the like of each component are appropriately changed. The following description is specifically provided for better understanding of the gist of the invention, and does not limit the invention unless otherwise specified. The number, position, size, length, numerical value, or the like can be changed, omitted, or added without departing from the scope of the present invention.

Figure 1:
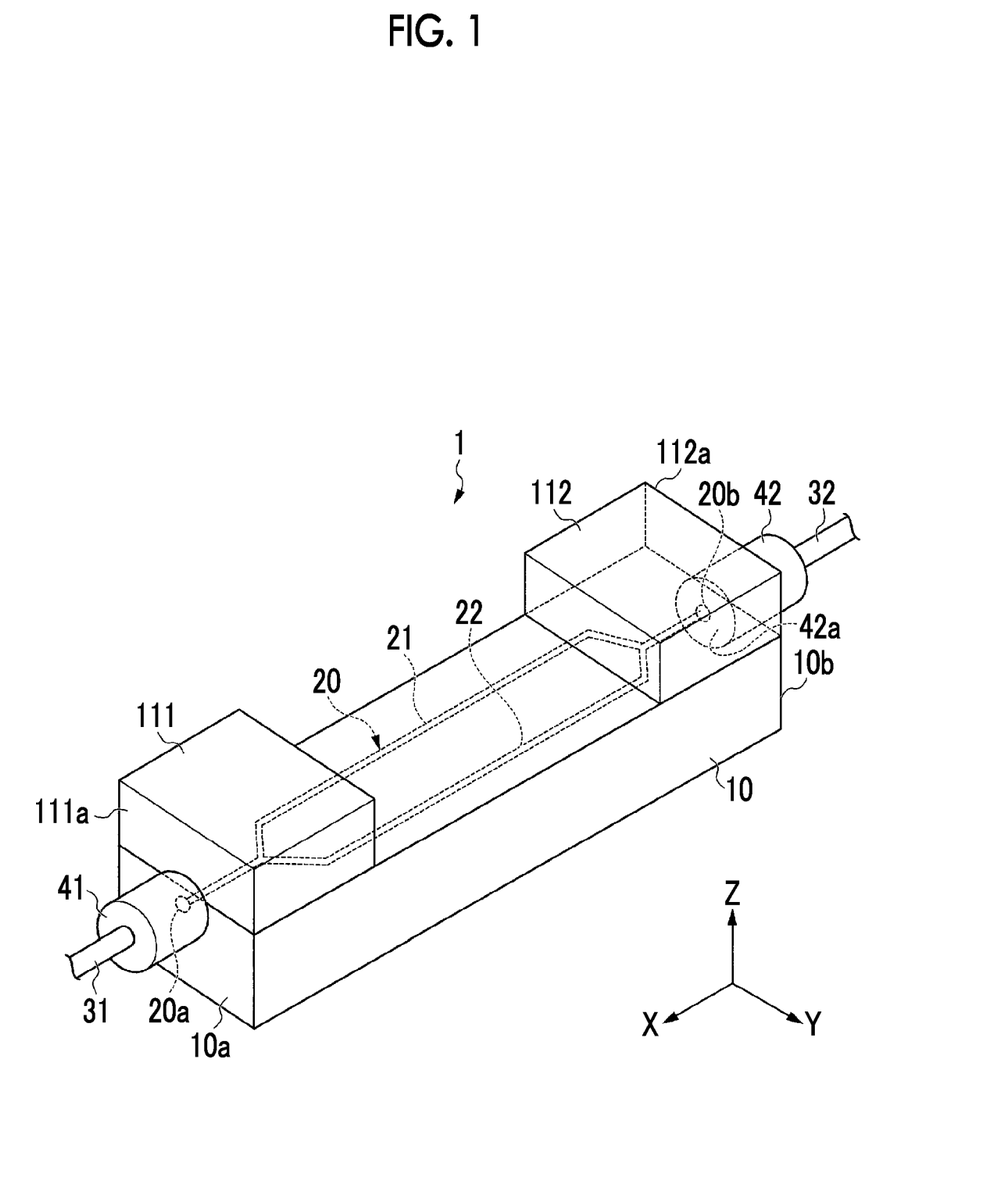
FIG. 1 is a schematic perspective view of an optical modulator 1.
Figure 2:
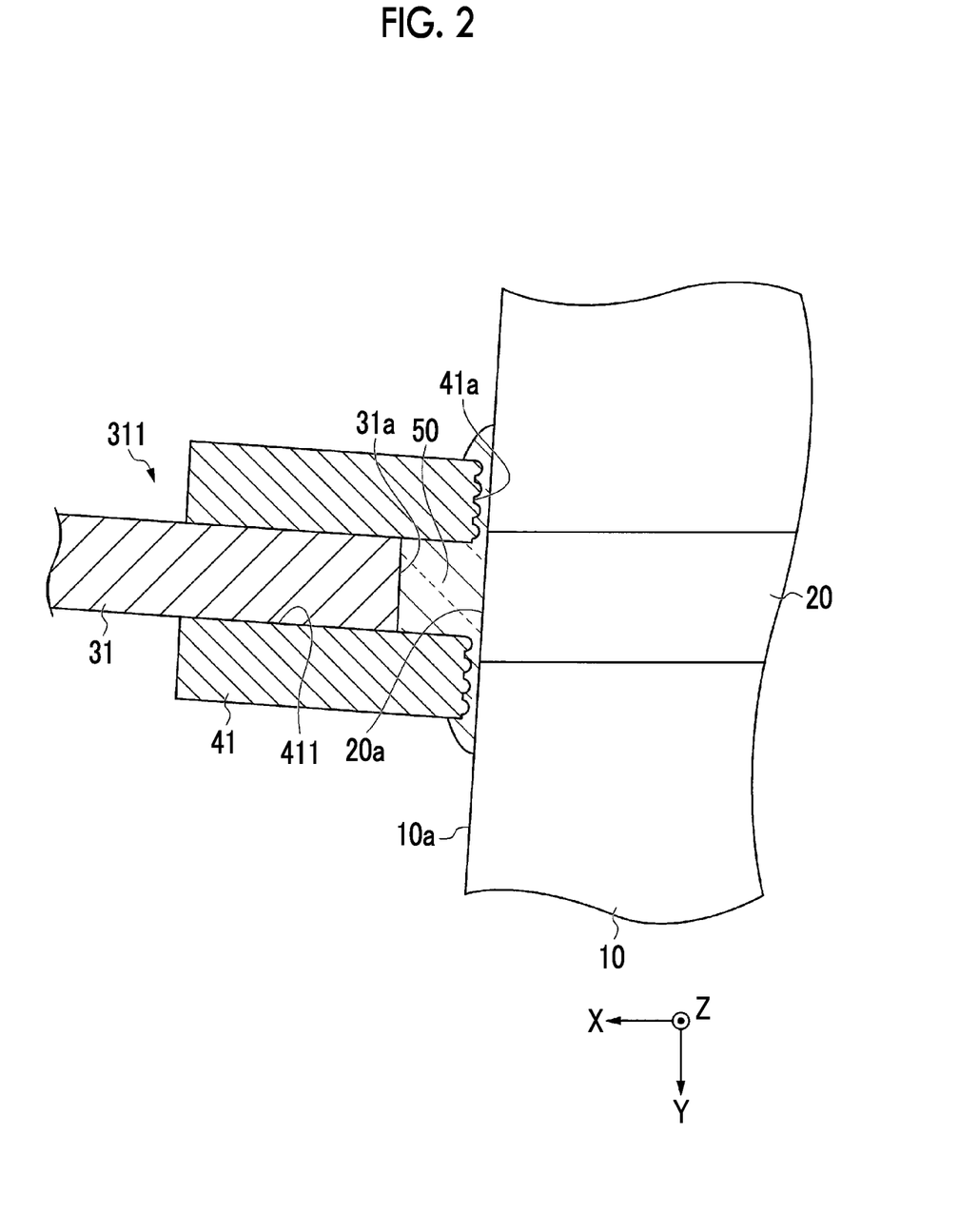
FIG. 2 is a schematic partially enlarged view of the optical modulator 1 in plan view.

FIG. 1 is a schematic perspective view of the optical modulator 1. As shown in FIGS. 1 and 2, the optical modulator 1 includes a substrate 10, an optical waveguide 20, auxiliary members 111 and 112, optical fibers 31 and 32, fixation members 41 and 42, and an optical adhesive layer 50.

In the following description, an XYZ coordinate system is set, and the positional relationship between members will be described with reference to this XYZ coordinate system. In this case, the thickness direction of the substrate 10 is the Z-axis direction, the longitudinal direction of the substrate 10 is the X-axis direction, and the width direction of the substrate 10 is the Y-axis direction.

Here, the field of view of the optical modulator 1 of the present embodiment in "plan view" means the field of view from the Z-axis direction.

The substrate 10 is a plate-shaped member that is rectangular in plan view and uses a material having an electro-optic effect as a forming material. As a material for forming the substrate 10, a crystalline material such as lithium niobate ($LiNbO_3$:LN), lithium tantalate ($LiTaO_3$), or lanthanum zirconate titanate (PLZT) can be preferably used.

When a crystalline material is used as the material for forming the substrate 10, an optical waveguide can be formed by using a known technique such as thermal diffusion of a metal such as Ti to a plate made of the crystalline material, rib formation by etching, and proton replacement.

Further, as a material for forming the substrate 10, an organic electro-optical polymer material in which an organic nonlinear optical compound is dispersed in a polymer material can also be used.

When an organic electro-optical polymer material is used as the material for forming the substrate 10, first, a low refractive index layer, a high refractive index layer, and a low refractive index layer are laminated on the base material in this order by using silicon or quartz as a base material and using two or higher polymer materials having different refractive indexes. In this case, the optical waveguide is patterned by applying etching or imprinting to the high refractive index layer or the low refractive index layer. The substrate 10 can be formed by using an organic electro-optical polymer material for at least a part of the high refractive index layer and the low refractive index layer.

The optical waveguide 20 is formed on the substrate 10 in the longitudinal direction of the substrate 10. As shown in FIG. 1, the optical waveguide 20 included in the optical modulator 1 of the present embodiment is a single Mach-Zehnder type optical waveguide. One end 20a of the optical waveguide 20 is arranged on one end face 10a of the substrate 10, and an other end 20b of the optical waveguide 20 is arranged on an other end face 10b of the substrate 10.

The optical waveguide 20 has two parallel first waveguides 21 and second waveguides 22 extending in the longitudinal direction of the substrate 10. The polarization beam inputting to the inside of the optical waveguide 20 from the one end 20a of the optical waveguide 20 is branched and propagated to the first waveguide 21 and the second waveguide 22, respectively.

The optical modulator 1 preferably has a signal electrode and a ground electrode (not shown) near the first waveguide 21 and the second waveguide 22 in a plan view.

The signal electrode and the ground electrode change the refractive index of the optical waveguide 20 by the electric field applied between the signal electrode and the ground electrode. Thereby, the linearly polarization beam propagating through the optical waveguide 20 can be modulated.

The types of the signal electrode and the ground electrode are not particularly limited. For example, in an electro-optical element using a crystal substrate such as $LiNbO_3$ as the substrate 10, a coplanar line is often adopted. Further, in an electro-optical element using a substrate made of an organic electro-optical polymer material as the substrate 10, a microstrip line is often adopted.

The auxiliary members 111 and 112 are plate-shaped members bonded to the surface of the substrate 10.

The auxiliary member 111 is provided on one end face 10a side in the longitudinal direction of the substrate 10 in a plan view and at a position overlapping the one end 20a of the optical waveguide 20.

The auxiliary member 112 is provided on the other end face 10b side in the longitudinal direction of the substrate 10 in a plan view and at a position overlapping the other end 20b of the optical waveguide 20.

The one end face 111a of the auxiliary member 111 is provided so as to be flush with the surface of the substrate 10 on the one end face 10a side.

Examples of a method of forming the one end face 111a and the surface on the one end face 10a side on the same plane include a method of forming an end face by precision cutting with a dicer or the like after providing an auxiliary member, and a method of polishing and flattening the end face.

An other end face 112a of the auxiliary member 112 is provided to be flush with the surface of the substrate 10 on the other end face 10b side.

As the forming material of the auxiliary members 111 and 112, the same material as the substrate 10 can be used. Further, as a material for forming the auxiliary members 111 and 112, a silicon substrate, a glass substrate, a ceramics substrate or the like can be used.

The auxiliary member 111 and the auxiliary member 112 have a function of facilitating the connection between the optical fibers 31 and 32 and the substrate 10.
That is, the one end face 111a of the auxiliary member 111 can expand the one end face 10a of the substrate 10.
Therefore, the entire joining end face of the fixation member 41 described below to which the optical fiber 31 is bonded can be joined to the one expanded end face 10a.
Thereby, the adhesive strength between the optical fiber 31 and the one end face 10a can be increased.

Similarly, the other end face 112a of the auxiliary member 112 can expand the other end face 10b of the substrate 10. Therefore, the entire joining end face of the fixation member 42 described below to which the optical fiber 32 is bonded can be joined to the other expanded end face 10b. Thereby, the adhesive strength between the optical fiber 32 and the other end face 10b can be increased.

The optical fiber 31 includes a core that propagates an optical signal and a clad that is concentrically provided outside the core.

The diameter of the optical fibers 31 and 32 is, for example, about 125 μm.
The core diameter of the optical fibers 31 and 32 is, for example, about 10 μm.

The optical fiber 31 is inserted into a tubular fixation member 41, and is bonded to the one end face 10a of the substrate 10 together with the fixation member 41.
In this case, the core of the optical fiber 31 is optically connected to the one end 20a of the optical waveguide 20. Any material for forming the fixation member 41 can be selected, but glass or ceramics can be preferably used.

Similarly, the optical fiber 32 is inserted into the tubular fixation member 42, and is bonded to the other end face 10b of the substrate 10 together with the fixation member 42. In this case, the core of the optical fiber 32 is optically connected to the other end 20b of the optical waveguide 20.

FIG. 2 is a partially enlarged view of the optical modulator 1 in a plan view, and is an explanatory diagram illustrating a peripheral structure of the fixation member 41.

The fixation member 41 is a tubular member provided at the one end 311 of the optical fiber 31.
The end face 41a of the fixation member 41 faces the one end face 10a of the substrate 10 and is bonded to the one end face 10a of the substrate 10 via the optical adhesive layer 50. The optical fiber 31 is inserted into the through-hole 411 of the fixation member 41.

The optical adhesive layer 50 bonds the optical fiber 31, the fixation member 41, and the substrate 10 with each other, and optically couples the end face 31a of the optical fiber 31 and the one end 20a of the optical waveguide 20. In FIG. 2, it is assumed that the optical adhesive layer 50 enters the inside of the through-hole 411 and is in contact with the end face 31a of the optical fiber 31.

The optical fiber 31 and the fixation member 41 may be fixed to each other when adjusting the optical coupling. Further, the optical fiber 31 and the fixation member 41 may not be fixed to each other during the optical coupling adjustment, and when the fixation member 41 and the substrate 10 are bonded together, the optical fiber 31 and the fixation member 41 may also be fixed together.

As the optical adhesive forming the optical adhesive layer 50, a commonly known material can be used.

In the optical modulator 1 of the present invention, the surface roughness of the end face 41a of the fixation member 41 is different from the surface roughness of the one end face 10a of the substrate 10. Therefore, even when the end face 31a of the optical fiber 31 and the one end face 10a of the substrate 10 are butted against each other via an optical adhesive, the end faces are unlikely to be adsorbed to each other by the ambient atmospheric pressure, and the adsorption is easily suppressed. Therefore, the optical fiber 31 and the fixation member 41 are easily moved in the in-plane direction of the one end face 10a of the substrate 10, and the optical coupling adjustment between the optical fiber 31 and the optical waveguide 20 is facilitated.

In the present embodiment, the surface roughness of the end face 41a of the fixation member 41 is larger than the surface roughness of the one end face 10a of the substrate 10 facing the end face 41a of the fixation member 41.

It is also possible to make the surface roughness of the one end face 10a of the substrate 10 larger than the surface roughness of the end face 41a of the fixation member 41. However, when the surface roughness of the one end face 10a of the substrate 10 is increased, the surface roughness of the one end 20a of the optical waveguide 20 is increased, which may scatter an optical signal. On the other hand, by increasing the surface roughness of the end face 41a of the fixation member 41 as in the present embodiment, it is possible to suppress the scattering of the optical signal at the one end 20a of the optical waveguide 20 as described above.

Further, since the fixation member 41 and the optical fiber 31 are separate members, they can be processed individually and their surface roughness can be adjusted to be different. For example, when the surface roughness of the end face 41a of the fixation member 41 is made larger than the surface roughness of the end face 31a of the optical fiber 31, it is possible to suppress the scattering of the optical signal on the end face 31a of the optical fiber 31.

The difference between the surface roughness $Ra_1$ of the one end face 10a of the substrate 10 and the surface roughness $Ra_2$ of the end face 41a of the fixation member 41 is preferably 0.2 μm or higher. Further, it is preferable that the surface roughness $Ra_1$ of the one end face 10a is 0.2 μm or lower and the surface roughness $Ra_2$ of the end face 41a is 0.4 μm or higher and 3 μm or lower. When the surface roughness $Ra_1$ of the one end face 10a and the surface roughness $Ra_2$ of the end face 41a are within the above range, each member is easily processed and optical coupling is easily adjusted.

Note that "surface roughness $Ra_1$" and "surface roughness $Ra_2$" in the present embodiment adopts a value of "arithmetic surface roughness Ra" which is measured by the method specified in JIS B 0601.

The end face 31a of the optical fiber 31 is preferably located in the through-hole 411 as shown in FIG. 2.
The end face 31a of the optical fiber 31 is arranged at a position recessed from the end face 41a of the fixation member 41, in the visual field from the one end 20a side of the optical waveguide 20. That is, the distance between the end face 31a of the optical fiber 31 and the one end face 10a of the substrate 10 is larger than the distance between the end face 41*a* of the fixation member 41 and the one end face 10*a* of the substrate 10.

In the optical modulator 1 adopting such a configuration, the end face 31*a* of the optical fiber 31 is less likely to be damaged when adjusting the optical coupling, and light scattering at the end face 31*a* of the optical fiber 31 can be suppressed.

The relationship between the surface roughness of the end face 42*a* of the fixation member 42 and the surface roughness of the other end face 10*b* of the substrate 10 is preferably controlled similarly to the relationship between the surface roughness of the end face 41*a* of the fixation member 41 and the surface roughness of the one end face 10*a* of the substrate 10 described above.

That is, the surface roughness of the end face 42*a* of the fixation member 42 is different from the surface roughness of the other end face 10*b* of the substrate 10, and the surface roughness of the end face 42*a* of the fixation member 42 is preferably greater than the surface roughness of the other end face 10*b* of the substrate 10. The difference between the surface roughness $Ra_1$ of the other end face 10*b* of the substrate 10 and the surface roughness $Ra_2$ of the end face 42*a* of the fixation member 42 is preferably 0.2 μm or higher. Further, it is preferable that the surface roughness $Ra_1$ of the other end face 10*b* is 0.2 μm or lower, and the surface roughness $Ra_2$ of the end face 42*a* is 0.4 μm or higher and 3 μm or lower.

With such a configuration, the optical fiber 32 and the fixation member 42 are easily moved in the in-plane direction of the other end face 10*b* of the substrate 10, and the optical coupling adjustment between the optical fiber 32 and the optical waveguide 20 is facilitated.

The surface roughness of the end face 41*a* of the fixation member 41 and the surface roughness of the end face 42*a* of the fixation member 42 may be the same or different. When the surface roughness of the end face 41*a* of the fixation member 41 and the surface roughness of the end face 42*a* of the fixation member 42 are the same, it is preferable that the same member can be used as the fixation member 41 and the fixation member 42.

The surface roughness of the one end face 10*a* and the surface roughness of the other end face 10*b* of the substrate 10 may be the same or different. When the surface roughness of the one end face 10*a* and the surface roughness of the other end face 10*b* are the same, the substrate 10 can be adjusted by performing the same processing on the one end face 10*a* and the other end face 10*b* of the substrate 10, so that manufacturing is facilitated, which is preferable. The optical modulator 1 of the present embodiment has the above-described configuration.

According to the optical modulator 1 having the above-described configuration, the optical coupling adjustment between the optical fiber 31 and the optical waveguide 20 can be easily performed, and the optical modulator in which the optical loss is suppressed can be obtained.

In the present embodiment, the surface roughness $Ra_2$ of the end face 41*a* of the fixation member 41 is larger than the surface roughness $Ra_1$ of the one end face 10*a* of the substrate 10, but the surface roughness $Ra_2$ may be smaller than the surface roughness $Ra_1$.

Further, although the tubular fixation members 41 and 42 are used in the present embodiment, the present invention is not limited to this.

For example, the fixation member may be a block having a V groove, and the optical fiber 31 may be fixed to the V groove.

In this case, by making the surface roughness of the end face of the block different from the surface roughness of the end face of the substrate 10, it becomes easy to move the optical fiber 31 and the fixation member in the in-plane direction of the end face of the substrate 10.

This facilitates the optical coupling adjustment between the optical fiber 31 and the optical waveguide 20.

Further, in the present embodiment, the number of the optical waveguides and the number of the optical fibers 31 at the end part of the optical waveguide 20 are one, but the numbers may be plural.

It is known that the optical waveguide formed on the substrate 10 and the plurality of optical fibers 31 are fixed by using a block such as a fiber array as a fixation member. As described above, when the number of the optical fibers 31 is plural, the size of the fixation member that holds the plurality of optical fibers is increased, and the end face of the fixation member is also increased. As a result, the adsorption force between the end face of the substrate 10 and the end face of the fixation member becomes large, and adjustment of optical coupling tends to be difficult.

When the present invention is applied to such a configuration and the surface roughness of the end face of the fixation member is different from the surface roughness of the end face of the substrate, optical coupling adjustment between the plurality of optical fibers 31 and the end faces of the plurality of optical waveguides can be easily performed.

While examples of the preferred embodiments of the present invention have been described above with reference to the accompanying drawings, it is to be understood that the present invention is not limited thereto.

The shapes, combinations, and the like of the constituent members shown in the above-described examples are examples, and various modifications can be made based on design requirements or the like without departing from the gist of the present invention.

For example, the surface roughness of the one end face 111*a* of the auxiliary member 111 may be smaller than the surface roughness of the end face 41*a* of the fixation member 41. With such a configuration, it is possible to suppress the adsorption between the auxiliary member 111 and the fixation member 41, and it is possible to easily perform the optical coupling adjustment between the optical fiber and the optical waveguide.

Similarly, the surface roughness of the one end face 112*a* of the auxiliary member 112 may be smaller than the surface roughness of the end face 42*a* of the fixation member 42. With such a configuration, it is possible to further suppress the adsorption between the auxiliary member 112 and the fixation member 42, and it is possible to easily perform the optical coupling adjustment between the optical fiber and the optical waveguide.

The surface roughness of the one end face 111*a* of the auxiliary member 111 may be the same as the surface roughness of the one end face 10*a* of the substrate 10. Similarly, the surface roughness of the one end face 112*a* of the auxiliary member 112 may be the same as the surface roughness of the other end face 10*b* of the substrate 10.

With such a configuration, the surface roughness on one end face of the auxiliary member and the surface roughness on the end face of the substrate 10 become uniform, so that the difference from the surface roughness of the fixation member also becomes uniform, and the optical coupling adjustment between the optical fiber and the optical waveguide can be easily performed.

In FIG. 2, the distance between the end face 31a of the optical fiber 31 and the one end face 10a of the substrate 10 is larger than the distance between the end face 41a of the fixation member 41 and the one end face 10a of the substrate 10, but the distance may be the same.

In other words, the end face 41a of the fixation member 41 and the one end face 10a of the substrate 10 may be flush with each other.

Further, in the configuration of FIG. 2, an optical component such as a lens may be disposed between the end face 31a of the optical fiber 31 and the one end face 10a of the substrate 10. In this case, the optical component is disposed at a position recessed from the end face 41a of the fixation member 41.

Figure 3:
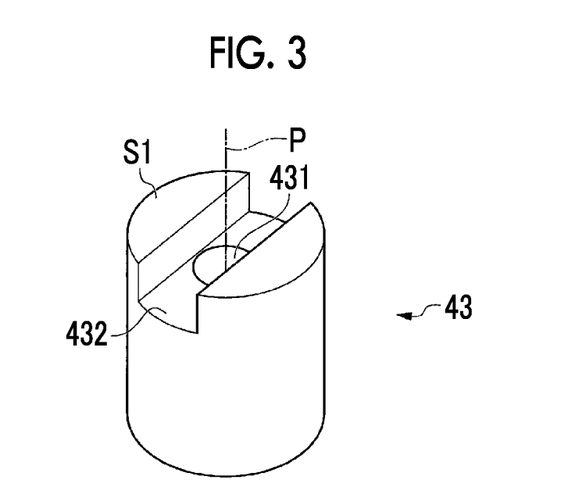
FIG. 3 is a schematic explanatory diagram showing a modification example of a fixation member.
Figure 4:
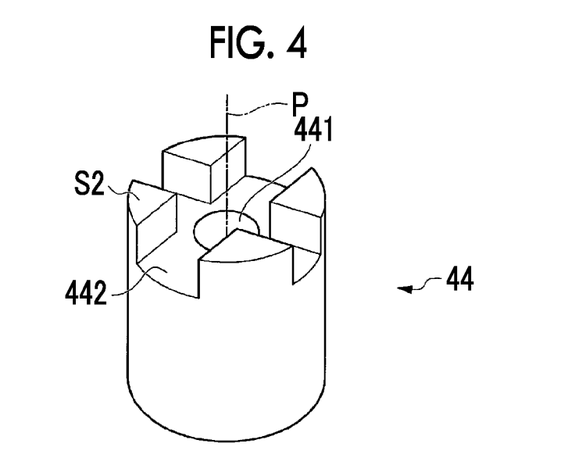
FIG. 4 is a schematic explanatory diagram showing a modification example of the fixation member.
Figure 5:
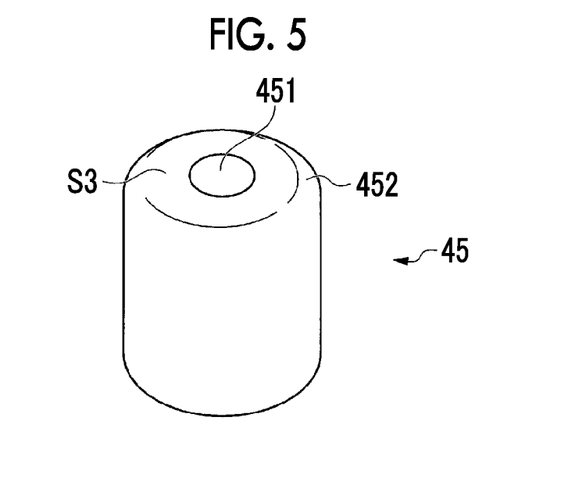
FIG. 5 is a schematic explanatory diagram showing a modification example of the fixation member.

FIGS. 3 to 5 are explanatory diagrams showing modification examples of the fixation member.

The fixation member 43 shown in FIG. 3 is a tubular member having a through-hole 431, and on one end side, has a groove 432 overlapping the through-hole 431 in the visual field in the direction of the central axis P of the through-hole 431. Thus, the area of the end face S1 of the fixation member 43 is smaller than the area of the end face of a simple cylinder having no groove 432.

The fixation member 44 shown in FIG. 4 is a tubular member having a through-hole 441, and on one end side, has a groove 442 that overlaps the through-hole 441 in the visual field in the direction of the central axis P of the through-hole 441 and crosses in an X shape. Thus, the area of the end face S2 of the fixation member 44 is smaller than the area of the end face of a simple cylinder having no groove 442.

The fixation member 45 shown in FIG. 5 is a tubular member having a through-hole 451, and the outer peripheral edge 452 on the one end side is chamfered. Thus, the area of the end face S3 of the fixation member 45 is smaller than the area of the end face of a simple cylinder that is not chamfered.

Even when these fixation members 43 to 45 are adsorbed to the end face of the substrate when they are butted against the end face of the substrate via the optical adhesive, the adsorbing strength is smaller than that of a simple cylindrical fixation member. Therefore, when the optical fiber is fixed using the fixation members 43 to 45, the end face of the optical fiber can be easily moved in the in-plane direction of the end face of the substrate, and the optical coupling adjustment between the optical fiber and the optical waveguide is easily performed.

INDUSTRIAL APPLICABILITY

It is possible to provide an optical modulator which is capable of easily performing the optical coupling adjustment between an optical fiber and an optical waveguide, and which is suppressed in the optical loss.

REFERENCE SIGNS LIST

1 Optical modulator
10 Substrate
10a One end face
10b Other end face
20 Optical waveguide
20a, 311 One end
20b Other end
21 First waveguide
22 Second waveguide
31, 32 Optical fiber
41 Fixation member
31a, 41a, S1, S2, S3 End face
41, 42, 43, 44, 45 Fixation member
42a End face of fixation member
50 Optical adhesive layer
111, 112 Auxiliary member
111a, 112a One end face of auxiliary member
411, 431, 441, 451 Through-hole
432, 442 Groove
452 Outer peripheral edge
S1, S2, S3 End face of fixation member
P Central axis of through-hole

The invention claimed is:

1. An optical modulator comprising:
a substrate which has electro-optic effects;
an optical waveguide which is provided in the substrate;
an optical fiber which is bonded to an end of the optical waveguide;
a fixation member which is provided on an end part of the optical fiber; and
an optical adhesive layer which bonds the optical fiber and the substrate to each other,
wherein
the end of the optical waveguide is arranged in an end face of the substrate,
the optical adhesive layer optically couples an end face of the optical fiber and an end of the optical waveguide with each other, while the optical adhesive layer bonds the optical fiber, the fixation member and the substrate with each other,
a surface roughness of a surface of the fixation member, wherein the surface of the fixation member faces the end face of the substrate, is different from a surface roughness of an end face of the substrate, wherein the end face of the substrate faces the surface of the fixation member, and the surface roughness of the surface of the fixation member is larger than the surface roughness of the end face of the substrate, which faces the surface of the fixation member.

2. The optical modulator according to claim 1, wherein a distance between the end face of the optical fiber and the end face of the substrate is larger than a distance between the surface of the fixation member and the end face of the substrate.

3. The optical modulator according to claim 1, wherein the fixation member is a tubular member having a through-hole through which the optical fiber is inserted.

4. The optical modulator according to claim 1, wherein the fixation member has a cylinder shape, and a cross section of the member has doughnut shape.

5. The optical modulator according to claim 3, wherein the fixation member has a groove on the surface thereof which faces the substrate, and the groove overlaps with the through-hole in the visual field in a direction of a central axis of the through-hole.

6. The optical modulator according to claim 5, wherein the groove is a crossed groove which is crossed in an X shape.

7. The optical modulator according to claim 3, wherein the surface of the fixation member, which faces the substrate, has a chamfered outer peripheral edge.

8. The optical modulator according to claim 3, wherein the end face of the optical fiber is located in the through-hole of the fixation member.

9. The optical modulator according to claim 1,
wherein
a difference between the surface roughness Ra1 of the end face of the substrate and the surface roughness Ra2 of the surface of the fixation member is 0.2 μm or higher.

10. An optical modulator comprising:
a substrate which has electro-optic effects;
an optical waveguide which is provided in the substrate;
an optical fiber which is bonded to an end of the optical waveguide;
a fixation member which is provided on an end part of the optical fiber; and
an optical adhesive layer which bonds the optical fiber and the substrate to each other,
wherein the end of the optical waveguide is arranged in an end face of the substrate, the optical adhesive layer optically couples an end face of the optical fiber and an end of the optical waveguide with each other, while the optical adhesive layer bonds the optical fiber, the fixation member and the substrate with each other,
a surface roughness of a surface of the fixation member, wherein the surface of the fixation member faces the end face of the substrate, is different from a surface roughness of an end face of the substrate, wherein the end face of the substrate faces the surface of the fixation member, and
a difference between the surface roughness $Ra_1$ of the end face of the substrate, which faces the surface of the fixation member, and the surface roughness $Ra_2$ of the surface of the fixation member is 0.2 μm or higher.

11. The optical modulator according to claim 10,
wherein the surface roughness $Ra_1$ is 0.2 μm or lower, and
wherein the surface roughness $Ra_2$ is 0.4 μm or higher and 3 μm or lower.

12. The optical modulator according to claim 10,
wherein a distance between the end face of the optical fiber and the end face of the substrate is larger than a distance between the surface of the fixation member and the end face of the substrate.

13. The optical modulator according to claim 10,
wherein the fixation member is a tubular member having a through-hole through which the optical fiber is inserted.

\* \* \* \* \*